UNITED STATES PATENT OFFICE.

PHILIP SCHIDROWITZ AND HAROLD ALBERT GOLDSBROUGH, OF LONDON, ENGLAND.

RUBBER SUBSTANCE AND PROCESS OF MAKING SAME.

1,156,184.  Specification of Letters Patent.  Patented Oct. 12, 1915.

No Drawing.   Application filed January 4, 1915. Serial No. 486.

*To all whom it may concern:*

Be it known that we, PHILIP SCHIDROWITZ and HAROLD ALBERT GOLDSBROUGH, both subjects of the King of Great Britain, residing at 57 and 58 Chancery Lane, London, W. C., England, have invented certain new and useful Improvements in Rubber Substances and Processes of Making Same, of which the following is a specification.

This invention relates to a new or improved rubber substance and to a process of making the same.

The invention has for its object to produce a new rubber substance or rubber in a new or improved condition suitable for use as sponge or the like, and not only to simplify and improve the process of reducing the rubber to that condition but also to enable the process to be freed from the very considerable resistance which has heretofore been opposed to such processes by the rubber itself.

Heretofore a variety of processes have been proposed for producing spongy or foamy or cellular rubber, all of which are based on substantially one principle, namely, that of incorporating with a plastic or ordinary rubber mixing, volatile or gas-forming substances which, on the application of heat, strive to escape from the plastic mass and so give rise to a porous or cellular formation. In the processes referred to this pore formation takes place during or at some stage of the process of heating or vulcanization in what was at the commencement of the process a substantially homogeneous and more or less plastic and tough rubber dough. Such processes have the drawback that, as a rubber mixture has no natural tendency on heating to become porous or spongy and especially not to form pores or a sponge of a commercially desirable character, it is necessary to induce sponge formation artificially in a somewhat unfavorable medium, and that therefore the ordinary processes for making spongy rubber are of a difficult and delicate character. Likewise, the processes producing so-called foam rubber, in which gases under pressure are stirred into a rubber solution, are relatively costly and difficult.

If rubber latex is subjected under certain conditions to the process of coagulation, the fresh coagulum is of a spongy or reticular character, which has heretofore been regarded as a disadvantage because for the preparation of dry raw rubber the spongy character must be got rid of, for which purpose a rolling or the like operation is necessary. Experiments of the applicants have now proved that it is possible to regulate this pore formation in a simple manner and to retain the pores in the mass, so that the disadvantages hitherto experienced in the manufacture of spongy or porous rubber are obviated.

According to the present invention the porous or spongy rubber substance is obtained by making it directly from rubber latex by coagulating the latter under conditions producing a porous or spongy coagulum and by fixing the pores so produced by vulcanization.

Another feature of the invention is that the latex or latex coagulum is vulcanized in a wet state. The spongy or cellular or reticular character is brought about prior to or during such vulcanization and the coagulated rubber need not be washed for the removal of the coagulant and serum.

The improved process of making the rubber sponge or like substance is therefore direct, simple, and economical, being carried out directly on the latex.

In carrying the invention into practice the coagulation may be caused or effected in any suitable way as by means of a coagulant or by heat or by the use of a rubber solvent or precipitant, or by any two or more of these means.

The amount and nature of the coagulant used will depend on the nature and condition of the latex and on the character of the product desired. Thus a coagulant readily soduble in the cold in water or latex, such as acetic acid, may be employed either in such a quantity as to produce immediate or retarded coagulation in the cold or in such quantity as to produce coagulation or only incomplete coagulation in the cold, but complete or satisfactory coagulation when heated. A coagulant which is comparatively insoluble in cold water or latex (such as some of the organic acids) may be employed by suspending the same in the latex and then heating (either prior to or as part of the vulcanization process), when the increasing solubility of such coagulant will enable it to bring about the desired effect.

In the case of *Hevea Brasiliensis* latex, an acid such as acetic acid or other suitable acid or acid salts or other coagulant may be used for this purpose with or without dilution of the latex, and with or without heating prior to vulcanization. In some cases as for instance with *funtumia* latex, or a preserved latex coagulable by heat, heat alone will suffice. Or, a rubber solvent, such as carbon-bisulfid or benzene or a precipitant such as acetone or alcohol or a mixture of these sufficient to cause complete or partial coagulation without excessively firm clotting, may be employed, with or without heat as may be found most suitable.

The natural sponge or pore formation can be modified or increased in any suitable way. For instance by the addition either before or during or after the coagulation of substances capable of producing gas on subjecting to heat or chemical action, such as carbonates or sulfids or other suitable compounds of sulfur or by the use, if the coagulation takes place in an alkaline medium, of a substance such as ammonia, or by the addition of a suitable volatile or volatizable solid or liquid exhibiting considerable vapor pressure at suitable temperatures within the range of temperatures employed in this process. For the vulcanization there may be used either sulfur as such or in solution, or a suitable compound of sulfur which will liberate sulfur but preferably either sulfur or the solution of a sulfid, or some form of commercial antimony or free sulfur containing commercial or other sulfid insoluble in water. If desired a vulcanizing agent may be used which can also serve as the gas producing agent. The vulcanizing substance may be added either before or during the incipient stage of coagulation; and the mass may be directly vulcanized by subjecting it to vulcanizing temperatures either in the open in steam or hot air in a vessel or mold or under water according to any of the well-known and suitable methods.

Besides vulcanizing materials, fibrous substances, fillers, pigments or dyes, accelerating agents, or any one or more of the ingredients ordinarily employed in rubber mixings may be added at any suitable stage of the process.

The vulcanized products obtained by the improved process possess true sponge structure so that after having been dried they will be capable of taking up large quantities of water and of swelling considerably, in which respect they differ essentially in many cases from the ordinary so-called rubber sponge made from a dough or from a so-called solution.

If desired, the vulcanized substance may be heated or boiled in a dilute caustic or other solution and then washed or otherwise treated to render them commercially more attractive, as for instance by dyeing or the like.

Hollow bodies may be formed by using suitable molds or by inserting suitable bodies into the latex prior to or during the process of coagulation; or the latex with or without the coagulant and vulcanizing agent and filling materials or the like may be poured or cast around such a body or bodies. Similarly, shaped bodies may be obtained by using suitably shaped molds for giving any desired shape to the exterior of the mass. Or, handles or other articles intended to serve as carriers and provided or not with grooves or other recesses may be dipped into the mass so that the substance will form upon such articles during the vulcanizing process. For instance, for making washing gloves, or like scrubbers, or rubber sponge bodies with a base, carrier, or binding medium of a textile fabric or other fibrous material, such fibrous material may be dipped into or passed through the treated or untreated latex so as to cause it to take up the desired amount thereof and may then be treated according to any of the above described methods that may be suitable for its purpose. A useful application of this part of the invention may consist in the manufacture of washing gloves from Turkish toweling and latex as described.

The process is capable of considerable modification without departing from the scope of the invention especially in view of the variable and uncertain character of the latex; but a few illustrative examples will now be given.

*Examples.*

1. Equal quantities by volume of latex and of a saturated solution of ammonium carbonate mixed together are heated in a water bath and one per cent. by weight of finely divided sulfur stirred in. Coagulation may be induced by adding a sufficiency of acetic acid while stirring the mixture and the containing vessel is then placed in a steam vulcanizer and cured for about 1 hour at 260° F., the quantity of acid and curing time and temperatures being varied according to the latex employed and to the nature of the sponge desired.

2. To 100 cubic centimeters of *Hevea* latex 4 grams of finely ground ammonium carbonate are added, and then 100 cubic centimeters of an 8 per cent. solution of sulfur in carbon bisulfid (100 c. c. containing 8 grams) are stirred in until a fairly firm coagulum is obtained. This is vulcanized for say half an hour to one hour in steam.

3. To 100 cubic centimeters of latex, 100 grams of powdered ammonium carbonate are added and then 40 cubic centimeters of carbon bisulfid containing in solution 2 grams of sulfur until a coagulum is obtained, which is vulcanized under water for about forty minutes.

4. To 100 cubic centimeters of latex, containing about 33 per cent. of solids are added 5 cubic centimeters of a solution of sodium polysulfid prepared by passing sulfureted hydrogen into caustic soda solution and adding sulfur, such polysulfid containing about 33 per cent. of precipitable sulfur. To 100 c. c. of latex so treated there are added 25 c. c. of 5 per cent. acetic acid and the mixture is stirred until creaming or incipient coalescing or coagulation takes place, after which 100 c. c. of a one per cent. acetic acid solution is added and the mixture stirred until a homogeneous cream, not coagulum, is obtained. This is then warmed on a water bath until the sponge formation is satisfactory. The containing vessel is placed in a steam vulcanizer and cured for 30 to 60 minutes, according to the condition of the latex and the character of the sponge desired.

5. To 100 c. c. of latex to which sodium polysulfid has been added as in Example 4, 5 per cent. acetic acid is gradually added with continual stirring until creaming sets in. This takes about 20 c. c. of acetic acid. Then five grams of powdered barium carbonate are stirred well in, and the mixture is then diluted with 50 c. c. of water and stirred again, during which operation a sufficiency of 5 per cent. acetic acid is added to cause coagulation and effervescence. This stage requires about fifty c. c. of acetic acid. The container is then placed in a vulcanizer and the contents cured for about 30 minutes at 286° F.

6. As in Example 5, but instead of 5 grams of barium carbonate there is used a mixture of 5 grams of barium carbonate, plus five grams of magnesium carbonate, plus three grams of ammonium carbonate.

7. To 100 c. c. of latex sufficient 5 per cent. acetic acid is added to induce creaming (about 20 c. c.) after which there are stirred in three grams of finely divided sulfur and a mixture of barium, ammonium and magnesium carbonate as in Example 6, and about 50 c. c. of 5 per cent. acetic acid is then added and is vulcanized as before.

8. To 100 c. c. of latex sufficient 5 per cent. acetic acid is added to induce creaming, after which it is diluted with 50 c. c. of water. Three grams of finely divided sulfur are then stirred in and finally a sufficiency of 5 per cent. acetic acid is added to produce a stiffening, but not complete coagulation—for which purpose 20 to 50 c. c. of the acid are necessary. The mixture is vulcanized as before, with or without previous heating on the water bath.

9. To 100 c. c. of latex there are stirred in 10 grams of precipitated chalk, 6 grams of sulfur, and 20 grams of powdered salicylic acid 100 c. c. of water are added, and the mixture is stirred thoroughly and vulcanized as before.

10. To 100 c. c. of latex containing 1 to 3 per cent. of ammonia are added 10 c. c. of an alkaline sulfid solution containing 30 per cent. precipitable sulfur (or an equivalent of ordinary sulfur in suspension) and 2 grams of powdered ammonium carbonate. There is then added 20 to 40 c. c. glacial acetic acid according to the alkalinity of the latex and character of the sponge desired, diluted with 20 c. c. to 120 c. c. of water, the mixture is stirred and the containing vessel is placed in the vulcanizer.

The invention is capable of numerous uses or applications besides those mentioned above, as for instance for upholstery or flooring, for various articles of personal or domestic use, and for apparatus to be used for games or sports, especially golf balls, rowing pads, or the like.

What we claim as our invention and desire to secure by Letters Patent is:—

1. The hereinbefore described process of manufacturing a porous or spongy rubber composition which comprises coagulating rubber latex under conditions producing a porous or spongy coagulum and fixing the pores by vulcanization.

2. The process of manufacturing a porous or spongy rubber composition which comprises coagulating rubber latex under conditions producing a porous or spongy coagulum, and fixing the pores by vulcanization of the wet coagulum by means of vulcanizing agents which are added at any suitable stage of the process.

3. The process of manufacturing a porous or spongy rubber composition which comprises coagulating rubber latex under conditions producing a porous or spongy coagulum, purifying or separating the coagulum, and fixing the pores by vulcanization of the wet coagulum by means of vulcanizing agents which are added at any suitable stage of the process.

4. The process of manufacturing a porous or spongy rubber composition which comprises coagulating rubber latex under conditions producing a porous or spongy coagulum, and fixing the pores by vulcanization by means of vulcanizing agents which are added at any suitable stage of the process, said coagulation being brought about during the vulcanization.

5. The process of manufacturing a porous or spongy rubber composition which comprises coagulating rubber latex under conditions producing a porous or spongy coagulum, by means of cold acting coagulants and fixing the pores by vulcanization of the wet coagulum by means of vulcanizing agents which are added at any suitable stage of the process.

6. The process of manufacturing a porous or spongy rubber composition which comprises coagulating rubber latex under conditions producing a porous or spongy coagulum by means of coagulants which only cause retarded or partial coagulation and only coagulate completely on heating, and fixing the pores by vulcanization of the wet coagulum by means of vulcanizing agents which are added at any suitable stage of the process.

7. The process of manufacturing a porous or spongy rubber composition which comprises coagulating rubber latex under conditions producing a porous or spongy coagulum by means of coagulants which only cause retarded or partial coagulation and only coagulate completely on heating, purifying or separating the coagulum, and fixing the pores by vulcanization of the wet coagulum by means of vulcanizing agents which are added at any suitable stage of the process.

8. The process of manufacturing a porous or spongy rubber composition which comprises coagulating rubber latex under conditions producing a porous or spongy coagulum by means of a liquid capable of dissolving or precipitating rubber, and fixing the pores by vulcanization of the wet coagulum by means of vulcanizing agents which are added at any suitable stage of the process.

9. The process of manufacturing a porous or spongy rubber composition which comprises coagulating rubber latex under conditions producing a porous or spongy coagulum by means of a liquid capable of dissolving or precipitating rubber, purifying or separating the coagulum, and fixing the pores by vulcanization of the wet coagulum by means of vulcanizing agents which are added at any suitable stage of the process.

10. The process of manufacturing a porous or spongy rubber composition which comprises coagulating rubber latex under conditions producing a porous or spongy coagulum by the action of heat, and fixing the pores by vulcanization of the wet coagulum by means of vulcanizing agents which are added at any suitable stage of the process.

11. The process of manufacturing a porous or spongy rubber composition which comprises coagulating rubber latex under conditions producing a porous or spongy coagulum by the action of heat, purifying or separating the coagulum, and fixing the pores by vulcanization of the wet coagulum by means of vulcanizing agents which are added at any suitable stage of the process.

12. The process of manufacturing a porous or spongy rubber composition which comprises coagulating rubber latex under conditions producing a porous or spongy coagulum, adding fillers at any suitable stage of the process, and fixing the pores by vulcanization of the wet coagulum.

13. The process of manufacturing a colored porous or spongy rubber composition which comprises coagulating rubber latex under conditions producing a porous or spongy coagulum, and fixing the pores by vulcanization of the wet coagulum, dyes being added at any suitable stage of the process.

14. The process of manufacturing a porous or spongy rubber composition which comprises coagulating rubber latex under conditions producing a porous or spongy coagulum, and fixing the pores by vulcanization of the wet coagulum, accelerating agents being added at any suitable stage of the process.

15. The process of manufacturing a porous or spongy rubber composition which comprises coagulating rubber latex under conditions producing a porous or spongy coagulum, adding at any suitable stage of the process substances capable of producing gases on being subjected to heat or chemical action, and fixing the pores by vulcanization of the wet coagulum.

16. The process of manufacturing a porous or spongy rubber composition which comprises coagulating rubber latex under conditions producing a porous or spongy coagulum, adding at any suitable stage of the process volatile or volatilizable substances with considerable vapor pressure, and fixing the pores by vulcanization of the wet coagulum.

17. The process of manufacturing a porous or spongy rubber composition of any desired shape, which comprises inserting molds, cores, or shaped bodies into rubber latex, coagulating the latex under conditions producing a porous or spongy coagulum, and fixing the pores by vulcanization of the wet coagulum.

18. The process of manufacturing a porous or spongy rubber composition of any desired shape which comprises coagulating rubber latex under conditions producing a porous or spongy coagulum, inserting molds, cores, or shaped bodies into said coagulum, and fixing the pores by vulcanization of the wet coagulum.

19. The process of manufacturing a porous or spongy rubber composition of any desired shape, which comprises coagulating rubber latex under conditions producing a porous or spongy coagulum and fixing the pores by vulcanization of the wet coagulum in suitably shaped molds or bodies.

20. The process of manufacturing a porous or spongy rubber composition with a base, carrier, or binder of a fabric or other fibrous material which comprises causing said material to take up a desired quantity of latex, coagulating said latex under conditions producing a porous or spongy coagulum and fixing the pores by vulcanization of the wet coagulum.

21. The process of manufacturing a porous or spongy rubber composition which comprises coagulating rubber latex under conditions producing a porous or spongy coagulum and fixing the pores by vulcanization of the wet coagulum, heating or boiling the vulcanized substance in dilute caustic or other solutions and washing or otherwise treating the same to render it commercially more attractive.

22. A porous or spongy rubber composition obtained by coagulating rubber latex under conditions producing a porous or spongy coagulum and fixing the pores by vulcanization.

23. A porous or spongy rubber composition obtained by coagulating rubber latex under conditions producing a porous or spongy coagulum and fixing the pores by vulcanization of the wet coagulum.

24. A porous or spongy rubber composition having a base, carrier, or binder of a fabric or other fibrous material and manufactured by causing said material to take up a desired quantity of latex, coagulating said latex under conditions producing a porous or spongy coagulum and fixing the pores by vulcanization of the wet coagulum.

In testimony whereof, we have affixed our signatures in presence of two witnesses.

PHILIP SCHIDROWITZ.
HAROLD ALBERT GOLDSBROUGH.

Witnesses:
ALBERT MOND,
GRACE E. SPURLING.